United States Patent [19]
Tsyrulnikov et al.

[11] Patent Number: 5,880,059
[45] Date of Patent: Mar. 9, 1999

[54] CATALYST FOR DEEP OXIDATION OF CARBON OXIDE AND ORGANIC COMPOUNDS

[75] Inventors: Pavel Grigorievich Tsyrulnikov; Sergel Aleksandrovich Stuken; Elena Nikolaevna Kudrya, all of Omsk; Vladimir Aleksandrovich Balashov, Novosibirsk; Olga Aleksandrovna Kachkina, Novosibirsk; Vladimir Alekseevivh Lyubushkin, Novosibirsk; Oleg Vasilievich Atamanchuk, Novosibirsk, all of Russian Federation

[73] Assignee: Institut Kataliza imeni G.K. Boreskova Sibirskogo otdelenia Rossiiskos Akademii Nauk, Novosibirsk, Russian Federation

[21] Appl. No.: 737,889
[22] PCT Filed: Jun. 1, 1995
[86] PCT No.: PCT/RU96/00114
  § 371 Date: Dec. 2, 1996
  § 102(e) Date: Dec. 2, 1996
[87] PCT Pub. No.: WO95/33560
  PCT Pub. Date: Dec. 14, 1995

[30] Foreign Application Priority Data

Jun. 2, 1994 [RU] Russian Federation ............ 94020864

[51] Int. Cl.⁶ .................................................. B01J 23/32
[52] U.S. Cl. .......................................... 502/324; 502/355
[58] Field of Search ..................... 502/324, 355

[56] References Cited

U.S. PATENT DOCUMENTS 3,764,564  10/1973  Maselli et al. ........................ 252/465
4,310,717   1/1982  Eastman et al. ...................... 585/661
4,353,815  10/1982  Antos ............................... 252/466 PT

FOREIGN PATENT DOCUMENTS 2 010 449  9/1971  Germany.
52-38977   1/1974  Japan.

OTHER PUBLICATIONS

Carbon Oxide Removal From Exhaust Gases Using Manganese and Manganese–Copper Catalysts (0.5.340 –inorganic material technology), V.Sh. Bakhtadze, 1971 with English translation (no month.

*Primary Examiner*—Michael L. Lewis
*Assistant Examiner*—Alexander G. Ghyka
*Attorney, Agent, or Firm*—Evenson, McKeown, Edwards & Lenahan, P.L.L.C.

[57] ABSTRACT

A catalyst for the deep oxidation of organic compounds and carbon monoxide contains 2.7–11.5 mass. % of manganese (with respect to elementary manganese), balance alumina. Manganese stays as non-stoichiometric manganese oxide $\beta$-$Mn_3O_{4+x}$, where $0.1 \leq x \leq 0.25$, containing 80–95% of all manganese atoms, and as manganese aluminate containing 20–5% of manganese atoms. Alumina in the active component is presented by the high temperature forms $\alpha$-$Al_2O_3$ (72–95 catalyst mass. %) and $(\delta+\theta)$-$Al_3O_3$ (28–05 catalyst mass. %). The catalyst active component has a monolith defect structure, particles size being 50–70 Å. Catalyst phase composition and structure form during its thermal treatment at 900°–1000° C.

4 Claims, No Drawings

CATALYST FOR DEEP OXIDATION OF CARBON OXIDE AND ORGANIC COMPOUNDS

FIELD OF ART

The present invention relates to chemistry and concerns the chemical and phase composition of catalysts for a deep oxidation of organic compounds and carbon oxide. The latter are present in industrial exhaust gases, exhausts of inner combustion engines, natural gas. The invention can be used to clean industrial and exhaust gases before their ejection into the atmosphere and to obtain calorific heat.

STATE OF ART

There are several well known catalysts that help to perform the oxidation of organics and carbon oxide. Such catalysts should exhibit a high thermal shock resistance, since heat evolves during the reaction and catalyst bed temperature attains 400°–1000° C. With this regard catalysts based on aluminium-manganese system are quite promising.

The known manganese oxide based catalysts contain phase oxides, mostly $MnO_2$, mixed or not mixed with the oxides of other elements (e.g., the hopkalite catalysts, see the FRG patent No 2010449, MKI BO1J 23/34). These catalysts are prepared either via support impregnation by the Mn(II) salts solutions or by moulding (e.g., extrusion) conditioned paste or charge containing the oxides of aluminium, copper or such compounds as calcium aluminate (Bakhtadze V. Sh. Manganese and Manganese-Copper Catalysts, PhD thesis, Tbilisi, 1971).

Such catalysts are calcined in special furnaces at 550°–850° C. They, however, exhibit a low activity. Thus, in a model reaction of n-pentane oxidation a catalyst sample prepared via alumina impregnation by manganese nitrate solution shows activity lower than $6\times10^{-4}$ cm$^3$/(g s) at 30020 C. and current pentane concentration equal to 0.05 vol. %. X-ray phase analysis data and electron microscopy show that the phase composition of this sample includes rather large (up to 500 Å) particles of $\beta$-MnO2 and $\gamma$-Al$_2$O$_3$.

It is possible to obtain aluminium-manganese catalyst for the deep oxidation of organic compounds and carbon oxide peptizing an acid mixture of a phase oxide $Mn_2O_3$ with $\gamma$-Al$_2$O$_3$, then extruding it, drying and calcining at 800° C. (Japan patent No 52-38977 MKI BO1 D 53/34). This catalyst also shows a low catalytic activity, since its active component has a low dispersity and is well crystallized.

Therefore, the known aluminium-manganese catalysts, though exhibiting a good thermal stability necessary for the process performance, have a low activity caused by a large size and thus small surface of the active component.

DISCLOSURE OF THE INVENTION

The present invention aims at designing a catalyst for the deep oxidation of organic compounds and carbon oxide. The catalyst should be resistant to heat and show a high activity. For the purpose the catalyst suggested has the following composition: 2.7–11.5 mass. % of manganese, balance alumina.

Manganese (Mn) in the active component is represented by a defect non-stoichiometric oxide $\beta$-Mn$_3$O$_{4+x}$, where $0.1<x<0.25$, containing 80–95% of all manganese atoms and by manganese aluminate containing 20–5% of all manganese atoms. Alumina $Al_2O_3$ is presented by the high temperature forms $\alpha$ and $(\delta+\theta)$.

The catalyst of such phase and chemical composition is obtained via a high temperature treatment of moulded (extrudated) or impregnated catalyst at 900°–1000° C. During the thermal treatment initial solid solution $Mn_yO\gamma$-$Al_2O_3$ decomposes, and a disperse defect spinel phase $Mn_3O_{4+x}$ forms on the surface of generated high temperature aluminas as well as a solid solution based on manganese aluminate of non-identified composition.

The high temperature forms of alumina in the catalyst are represented by particles of irregular but round spatial configuration with a size of about 1000 Å. The defect spinel dispersed at the surface of the above particles consists of round agglomerated particles of non-stiochiometric manganese oxide having size of 400–500 Å. The two types of particles are fixed by the inteijacent layer. This layer is a product of an interaction between alumina and manganese oxide, namely the solid solution based on the manganese aluminate. Fixed position of the active manganese oxide at the surface of an alumina particle avoids fritting of the active component of the catalyst at high temperatures. Decreasing of the catalyst activity also drops down.

Electron microscopy shows that the active component particles attain 50–70 Å in size and have a segmented defect structure. This increases the catalyst surface dramatically and thus increases the catalyst activity as well.

A high performance electron microscopy and microdiffraction prove that manganese oxide with a defect spinel structure is present in the catalyst after its treatment in the temperature range mentioned.

Manganese oxidation degree in its oxide compounds is determined by a two-stage chemical analysis. The first stage is manganese oxide eluation by solution 0.1 N $H_2SO_4$+0.1 N KJ. At the second stage iodine evolved in the first stage is titrated by thiosulfate. The non-removed portion of manganese is a non-stoichiometric manganese aluminate of non-identified composition. Catalyst activity tested in two model reactions of deep oxidation of n-pentane and CO is by 5–10 fold higher than that of the known aluminium-manganese catalysts.

BEST MODE CARRYING-OUT THE INVENTION

The following examples help to understand the invention better.

EXAMPLE 1

159.2 g of aluminium hydroxide (pseudoboehmite modification) are impregnated by manganese nitrate solution till incipient wetness. When the solution fills the pores it contains 6.4 g of manganese with respect to elementary manganese. The samples thus obtained stays for 24 h in air, then it is dried for 4 h at 120° C. The dried samples passes to a cold muffle, where it is slowly heated up to 900° C. during 3 h and then kept at this temperature for 4 h. The catalyst thus obtained has the following composition:

| | |
|---|---|
| defect spinel comprising 87% of all manganese atoms present in the catalyst sample | 7.7 mass. % |
| manganese in alumina (manganese aluminate) comprising 13% of all manganese atoms in the sample, referred to elementary manganese | 0.3 mass. % |
| alumina modification $\alpha$-$Al_2O_3$ | 73.6 mass. % |
| alumina modification $(\delta + \theta)$-$Al_2O_3$ | 18.4 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %.

Catalyst activity towards n-pentane is expressed as $(W*10^4 \text{ ncm}^3)/(g_{cat}*s)$, where W is the oxidation rate, is equal to 40. Catalyst activity towards CO expressed as the temperature of 50% CO conversion is equal to 190° C.

EXAMPLE 2

153.9 g of aluminium hydroxide (pseudoboehmite modification) are impregnated by manganese nitrate solution till incipient wetness. When the solution fills the pores it contains 9.5 g of manganese with respect to elementary manganese. The samples thus obtained stays for 24 h in air, then it is dried for 4 h at 120° C. The dried sample passes to a cold muffle, where it is slowly heated up to 900° C. during 3 h and then kept at this temperature for 4 h. The catalyst thus obtained has the following composition:

| | |
|---|---|
| defect spinel comprising 90% of all manganese atoms present in the catalyst sample | 11.6 mass. % |
| manganese in alumina (manganese aluminate) comprising 10% of all manganese atoms in the sample, referred to elementary manganese | 0.9 mass. % |
| alumina modification α-Al$_2$O$_3$ | 83.6 mass. % |
| alumina modification (δ + θ)-Al$_2$O$_3$ | 4.4 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 \text{ ncm}^3)/(g_{cat}*s)$, where W is the oxidation rate, is equal to 40. Catalyst activity towards CO expressed as the temperature of 50% CO conversion is equal to 187° C.

EXAMPLE 3

149.6 g of aluminium hydroxide (baierite modification) are impregnated by manganese nitrate solution till incipient wetness. When the solution fills the pores it contains 12 g of manganese with respect to elementary manganese. The samples thus obtained stays for 24 h in air, then it is dried for 4 h at 120° C. The dried sample passes to a cold muffle, where it is slowly heated up to 1000° C. during 3 h and then kept at this temperature for 2 h. The catalyst thus obtained has the following composition:

| | |
|---|---|
| defect spinel comprising 92% of all manganese atoms present in the catalyst sample | 13.6 mass. % |
| manganese in alumina (manganese aluminate) comprising 8% of all manganese atoms in the sample, referred to elementary manganese | 0.8 mass. % |
| alumina modification α-Al$_2$O$_3$ | 85.6 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 \text{ ncm}^3)/(g_{cat}*s)$, where W is the oxidation rate, is equal to 45. Catalyst activity towards CO expressed as the temperature of 50% CO conversion is equal to 185° C.

EXAMPLE 4

149.6 g of aluminium hydroxide (baierite modification) are impregnated by manganese nitrate solution till incipient wetness. When the solution fills the pores it contains 12 g of manganese with respect to elementary manganese. The samples thus obtained stays for 24 h in air, then it is dried for 4 h at 120° C. The dried sample passes to a cold muffle, where it is slowly heated up to 90020 C. during 3 h and then kept at this temperature for 6 h. The catalyst thus obtained has the following composition:

| | |
|---|---|
| defect spinel comprising 95% of all manganese atoms present in the catalyst sample | 12.35 mass. % |
| manganese in alumina (manganese aluminate) comprising 5% of all manganese atoms in the sample, referred to elementary manganese | 0.45 mass. % |
| alumina modification α-Al$_2$O$_3$ | 76.4 mass. % |
| alumina modification (δ + θ)-Al$_2$O$_3$ | 10.8 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 \text{ ncm3})/(g_{cat}*s)$, where W is the oxidation rate, is equal to 45. Catalyst activity towards CO expressed as the temperature of 50% CO conversion is equal to 185° C.

EXAMPLE 5

175 g of the product of thermochemical activation of hydroargelite (or 75 mass. % if referred to Al$_2$O$_3$) are mixed with 27.4 g of MnO$_2$ (or 17 g if referred to elementary manganese). Then 2.35 g of binder/reducer polyvinyl alcohol (PVA) and 4.7 ml of peptizing nitric acid (acid module is 0.055 if referred to Al$_2$O$_3$) are added. The mixture obtained is stirred and the paste obtained goes to extrudation through a die to produce rings with external diameter of 12 mm. Then the rings are dried at 110° C. The dried rings are calcined first at 500° C., then at 950° C. for 6 h. The catalyst obtained has the following composition:

| | |
|---|---|
| defect spinel comprising 80% of all manganese atoms present in the catalyst sample | 12.5 mass. % |
| manganese in alumina (manganese aluminate) comprising 20% of all manganese atoms in the sample, referred to elementary manganese | 2.2 mass. % |
| alumina modification α-Al$_2$O$_3$ | 85.3 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 \text{ ncm}^3)/(g_{cat}*s)$, where W is the oxidation rate, is equal to 73. Catalyst activity towards CO expressed as the temperature of 50% CO conversion is equal to 173° C.

EXAMPLE 6

87.5 g of the product of thermochemical activation of hydroargelite and 65.6 g of mechanoactivated powder of γ-alumina are mixed with 27.4 g of MnO$_2$ (or 17 g if referred to elementary manganese). Then 2.35 g of binder/reducer polyvinyl alcohol (PVA) and 4.7 ml of peptizing nitric acid (acid module is 0.055 if referred to Al$_2$O$_3$) are added. The mixture obtained is stirred and the paste obtained goes to extrudation through a die to produce rings with external diameter of 12 mm. Then the rings are dried at 110° C. The dried rings are calcined first at 500° C., then at 95020 C. for 6 h. The catalyst obtained has the following composition:

| | |
|---|---|
| defect spinel $Mn_3O_{4.17}$ comprising 90% of all manganese atoms present in the catalyst sample | 13.9 mass. % |
| manganese in alumina (manganese aluminate) comprising 10% of all manganese atoms in the sample, referred to elementary manganese | 1.1 mass. % |
| alumina modification $\alpha$-$Al_2O_3$ | 85.0 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 ncm^3)/(g_{cat}*s)$, where W is the oxidation rate, is equal to 61.35. Catalyst activity towards CO expressed as the temperature of 50% CO conversion is equal to 175° C.

EXAMPLE 7

93.8 g of $\gamma$-alumina are impregnated by manganese nitrate solution containing 45.1 g of $Mn(NO_3)_2*H_2O$ (or, 8.6 g with respect to elementary manganese). The sample thus obtained is dried for 1.5 h at 110° C. then calcined in the muffle at 900° C. for 10 h. The catalyst thus obtained has the following composition:

| | |
|---|---|
| defect spinel $Mn_3O_{4.1}$ comprising 85% of all manganese atoms present in the catalyst sample | 9.7 mass. % |
| manganese in alumina (manganese aluminate) comprising 15% of all manganese atoms in the sample, referred to elementary manganese | 1.2 mass. % |
| alumina modification $\alpha$-$Al_2O_3$ | 89.1 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 ncm^3)/(g_{cat}*s)$, where W is the oxidation rate, is equal to 45. Catalyst activity towards CO expressed as the temperature of 50 % CO conversion is equal to 184° C.

EXAMPLE 8

100 g of alumina $((\gamma+\theta)$-$Al_2O_3$ are impregnated by manganese nitrate solution till incipient wetness. When the solution fills the pores it contains 6.12 g of manganese with respect to elementary manganese. The sample thus obtained stays for 24 h in air, then it is dried for 4 h at 12020 C. The dried sample passes to a cold muffle, where it is calcines at 900° C. for 6 h. The catalyst thus obtained has the following composition:

| | |
|---|---|
| defect spinel $Mn_3O_{4.2}$ comprising 95.1% of all manganese atoms present in the catalyst sample | 8.1 mass. % |
| manganese in alumina (manganese aluminate) comprising 4.9% of all manganese atoms in the sample, referred to elementary manganese | 0.4 mass. % |
| alumina modification $\alpha$-$Al_2O_3$ | 72.0 mass. % |
| alumina modification $(\delta + \theta)$-$Al_2O_3$ | 21.5 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 ncm^3)/(g_{cat}*s)$, where W is the oxidation rate, is equal to 42. Catalyst activity towards CO expressed as the temperature of 50% CO conversion is equal to 186° C.

EXAMPLE 9

100 g of alumina $\alpha$-$Al_2O_3$ are impregnated by manganese nitrate solution till incipient wetness. When the solution fills the pores it contains 5.26 g of manganese with respect to elementary manganese. The sample thus obtained is dried for 4 h at 120° C. The dried sample is calcined at 900° C. for 2 h. The catalyst thus obtained has the following composition:

| | |
|---|---|
| defect spinel $Mn_3O_{4.2}$ comprising 94% of all manganese atoms present in the catalyst sample | 6.7 mass. % |
| manganese in alumina (manganese aluminate) comprising 6% of all manganese atoms in the sample, referred to elementary manganese | 0.4 mass. % |
| alumina modification $\alpha$-$Al_2O_3$ | 92.7 mass. % |

The sample activity is tested in a flow-circulation setup in the model reactions of n-pentane and CO oxidation. Reactions occur at 300° C., current n-pentane concentration being 0.05 vol. %, current CO concentration being 1 vol. %. Catalyst activity towards n-pentane is expressed as $(W*10^4 ncm^3)/(g_{cat}*s)$, where W is the oxidation rate, is equal to 50. Catalyst activity towards CO expressed as the temperature of 50 % CO conversion is equal to 180° C.

INDUSTRIAL APPLICABILITY

The present invention help environment protection from toxic organic compounds and carbon monoxide. The catalyst can work in catalytic plants for industrial gas cleaning and in special plants producing high potential heat via the catalytic combustion of fuels, natural gas in particular.

We claim:

1. A catalyst for the deep oxidation of organic compounds and carbon monoxide includes manganese compounds and alumina characterized in that in the active component of the catalyst manganese is presented by a defect non-stoichiometric manganese oxide-$\beta$-$Mn_3O_{4+x}$, where re $0.1 \leq x \leq 0.25$, containing 80–95% of all manganese atoms, and by manganese aluminate containing 20–5% of manganese atoms and alumina is presented by the high-temperature forms $\alpha$-$Al_2O_3$ and $(\alpha+\delta+\theta)$-$Al_2O_3$, wherein the catalyst has the following composition:

manganese compounds—2.7–11.5 mass % expressed in elementary manganese;

alumina—the balance.

2. A catalyst for claim 1 characterized in that alumina comprises

| | |
|---|---|
| $\alpha$-$Al_2O_3$ | 72–95 mass % |
| $(\delta + \theta)$-$Al_2O_3$ | 28–05 mass %. |

3. A catalyst for claim 1 characterized in that the active component has a monolith defect structure, particle size being 50–70 Å.

4. A catalyst for claims 1, characterized in that the high temperature forms of alumina are the particles of irregular spatial configuration, and non-stoichiometric manganese oxide is presented by agglomerated smaller particles fixed on the surface of alumina particles by the layer based on the solid solution of manganese aluminate.

* * * * *